J. M. GIBBS.
VALVE SEATING ATTACHMENT.
APPLICATION FILED MAR. 26, 1910.
979,068.
Patented Dec. 20, 1910.
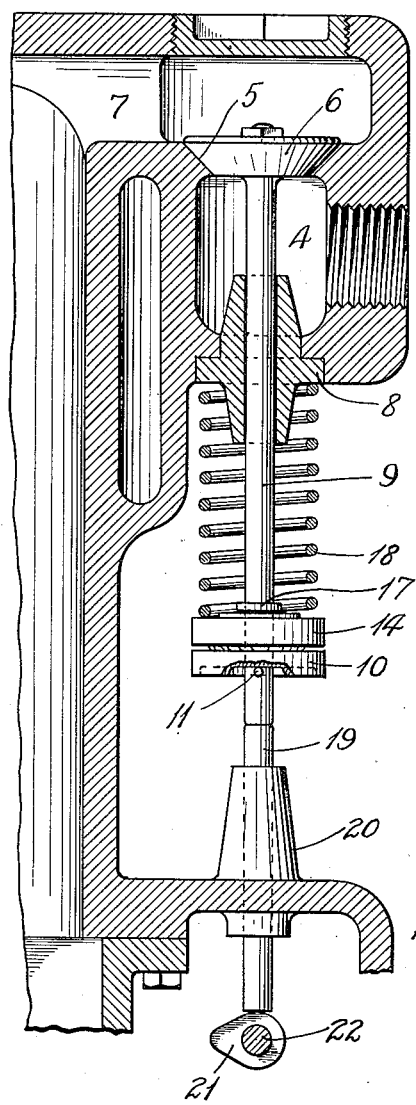
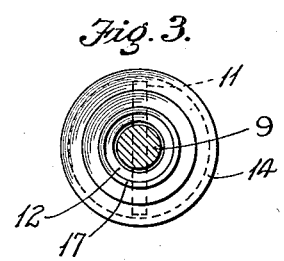
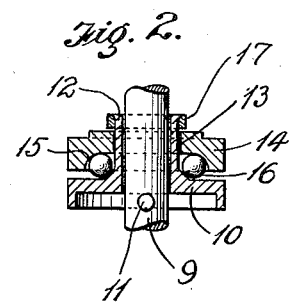
Witnesses.
Inventor:
James M. Gibbs.
by Attys.

UNITED STATES PATENT OFFICE.

JAMES M. GIBBS, OF SANTA ANA, CALIFORNIA, ASSIGNOR OF ONE-HALF TO GEORGE E. POWELL, OF SANTA ANA, CALIFORNIA.

VALVE-SEATING ATTACHMENT.

979,068.     Specification of Letters Patent.     Patented Dec. 20, 1910.

Application filed March 26, 1910. Serial No. 551,662.

*To all whom it may concern:*

Be it known that I, JAMES M. GIBBS, a citizen of the United States, residing at Santa Ana, in the county of Orange and State of California, have invented new and useful Improvements in Valve-Seating Attachments, of which the following is a specification.

This invention relates to valves and particularly to disk valves.

The object of the invention is to provide a valve of this class with means for facilitating the free rotation of the valve on its axis so that the valve and its seat will wear uniformly and enable the valve to close tight. When valves of this class are closed by the action of a spring, the spring exerts its pressure usually out of alinement with the axis of the stem of the valve, and this tends to twist or "cock" the valve toward one side, producing unequal wear. My invention overcomes this difficulty.

The invention is especially applicable to mechanically operated puppet valves such as used on gas engines.

In the annexed drawing which fully illustrates my invention, Figure 1 is a longitudinal central section taken through a valve chamber provided with a valve having my invention in connection therewith, and showing a portion of the wall of the engine. Fig. 2 is a vertical section taken at the lower end of the valve stem and illustrating details of the invention. Fig. 3 is a cross section through the valve stem and further illustrating the parts shown in Fig. 2.

Referring more particularly to the parts, 4 represents a valve chamber which is provided above with a conical valve seat 5 upon which closes a conical valve or disk 6, which will admit into the passage 7 from below or vice versa when the valve is open. The lower wall of the valve chamber 4 is provided with a stuffing box 8 through which the valve stem 9 passes downwardly. Near the lower end of the valve stem a collar 10 is attached by means of a pin 11 passing through the stem, as indicated. This collar has a reduced neck 12 which extends upwardly passing through an opening 13 formed in an upper collar 14. The upper collar 14 is formed with a cup or recess 15 on its under side which coöperates with the upper face of the collar 10 so as to form a ball race to receive antifriction balls 16. On the upper end of the tubular neck 12 a ferrule 17 is attached which secures the collars together as will be readily understood. Between the upper collar 14 and the stuffing box 8, a coil spring 18 is placed, the same being disposed around the stem 9 as indicated. Against the lower end of the stem 9 a rod 19 abuts, said rod being of the same diameter as the stem and mounted to slide longitudinally with the stem by sliding through a suitable guide 20. This valve rod 19 is adapted to be actuated by a cam 21 rigidly mounted on the shaft 22, which is driven continuously when the engine is in operation. The rotation of the shaft 22 opens the valve at the proper time, as will be readily understood.

With a valve mounted as described, it will be evident that the spring 18 will hold the valve on its seat. At the same time the pressure of the spring will exert very little tendency to prevent the valve stem from rotating freely on account of the antifriction collars which seat the spring on the stem. This is highly advantageous for the reason that the valve will tend to become displaced and will seat constantly in different positions and this will tend to cause uniformity of wear between the disk and the seat. When a coil spring, such as spring 18, is contracted or expanded there is a slight rotation produced in the coils at the free end of the spring, and this rotation is communicated in a greatly reduced ratio to the valve stem 9 through the antifriction connection. In this way the valve tends to rotate automatically when in operation, and therefore practically grinds itself constantly upon its seat.

Having described my invention what I claim as new and desire to secure by Letters Patent is:

1. In a device of the class described, a valve chamber having a valve seat, a disk closing upon said seat, a spring tending to force said disk upon said seat, and an antifriction device in connection with said spring tending to increase the facility of rotation of said disk.

2. In a device of the class described, in combination, a valve chamber having a seat, a valve having a disk closing upon said seat, a stem extending from said disk, means for guiding said stem, a spring tending to force said disk toward said seat, an antifriction device between said spring and said stem through which the pressure of said spring is exerted.

3. In a device of the class described, a valve chamber having a seat, a disk closing upon said seat, a stem extending from said disk, means for guiding said stem, a collar carried by said stem, a second collar having a ball bearing connection with said first collar, and a spring seating on said second collar and forcing said valve disk toward said seat.

In witness that I claim the foregoing I have hereunto subscribed my name this 19th day of March, 1910.

J. M. GIBBS.

Witnesses:
F. D. AMMEN,
E. A. STRAUSE.